(12) United States Patent
Zamborlin et al.

(10) Patent No.: US 10,817,798 B2
(45) Date of Patent: Oct. 27, 2020

(54) METHOD TO RECOGNIZE A GESTURE AND CORRESPONDING DEVICE

(71) Applicant: Mogees Limited, London (GB)

(72) Inventors: Bruno Zamborlin, London (GB);
Baptiste Caramiaux, Dhuizel (FR);
Carmine Emanuele Cella, Pantin (FR)

(73) Assignee: MOGEES LIMITED, London (GB)

( * ) Notice: Subject to any disclaimer, the term of this patent is extended or adjusted under 35 U.S.C. 154(b) by 0 days.

(21) Appl. No.: 15/140,301

(22) Filed: Apr. 27, 2016

(65) Prior Publication Data
US 2017/0315717 A1 Nov. 2, 2017

(51) Int. Cl.
*G06F 3/041* (2006.01)
*G06N 20/00* (2019.01)
*G06F 3/043* (2006.01)

(52) U.S. Cl.
CPC .......... *G06N 20/00* (2019.01); *G06F 3/0416* (2013.01); *G06F 3/0433* (2013.01)

(58) Field of Classification Search
CPC .. G06F 3/04883; G06F 3/0416; G06F 3/0436; G06F 3/015; G06F 1/1684; G06F 3/043; G06F 3/017; G06F 3/013; G06N 99/005; G06N 20/00; G03B 21/132; G09G 5/006; B25J 9/1656
See application file for complete search history.

(56) References Cited

U.S. PATENT DOCUMENTS

| | | | | |
|---|---|---|---|---|
| 5,748,183 A | * | 5/1998 | Yoshimura | G03B 21/132 345/173 |
| 6,720,984 B1 | * | 4/2004 | Jorgensen | G06F 3/015 600/300 |
| 7,333,090 B2 | * | 2/2008 | Tanaka | B25J 9/1656 345/158 |
| 2003/0159567 A1 | * | 8/2003 | Subotnick | G06F 3/04883 84/626 |
| 2009/0231295 A1 | * | 9/2009 | Petit | G06F 3/04883 345/173 |

(Continued)

OTHER PUBLICATIONS

James R. Andrews et al., Spectrum Amplitude—Definition, Generation and Measurement, Nat. Bur. Stand. (U.S.), Tech. Note 699, 100 pages (Oct. 1977), U.S. Government Printing Office Washington: 1977.*

*Primary Examiner* — Richard J Hong
(74) *Attorney, Agent, or Firm* — Nixon & Vanderhye, P.C.

(57) ABSTRACT

A method for recognizing a gesture using a first and second devices, wherein the gesture is made on a physical object. The first device may receive an entrance signal generated by the gesture, calculate descriptors of the gesture to assess characteristics of said entrance signal, segment, based on the descriptors, said entrance signal to obtain a group of segments and calculate physical values from said entrance signal, calculate a characteristic vector of signal features for each segment using the physical values, and process the characteristic vector of signal features for each segment to learn a metric function between gestures. The second device may determine, based on the metric function between gestures and characteristics of an entrance signal received by the second device, a specific exit signal correlated to a new gesture made in contact on another physical object; and supply the specific exit signal to another device.

21 Claims, 4 Drawing Sheets

(56) References Cited

U.S. PATENT DOCUMENTS

| | | | |
|---|---|---|---|
| 2011/0167391 A1* | 7/2011 | Momeyer | G06F 1/1684 |
| | | | 715/863 |
| 2013/0278552 A1* | 10/2013 | Kamin-Lyndgaard | ........................ |
| | | | G06F 3/04883 |
| | | | 345/174 |
| 2014/0232642 A1* | 8/2014 | Lefebvre | G06F 3/017 |
| | | | 345/156 |
| 2015/0123949 A1* | 5/2015 | Li | G06F 3/043 |
| | | | 345/177 |
| 2015/0149956 A1* | 5/2015 | Kempinski | G06F 3/013 |
| | | | 715/784 |

* cited by examiner

METHOD TO RECOGNIZE A GESTURE AND CORRESPONDING DEVICE

FIELD OF THE INVENTION

The present invention concerns a method to recognize a gesture such as, for example, a physical action, on a physical object by means of a device associated with the physical object and using this method.

By way of non-restrictive example, the present invention may be used in the field of sound reproduction, interaction with physical objects, command and management of devices as a function of specific gestures.

BACKGROUND OF THE INVENTION

The recognition of physical gestures is a field of human-machine interaction with the purpose of supplying devices and methods able to identify and classify various gestures in order to then command and/or control other devices connected to the recognition device according to the specific gesture made.

One of the main problems in known devices for recognizing a gesture is that they are not very sensitive to gestures that are not particularly accentuated, i.e. gestures with low intensities or gestures that do not generate any detectable signal.

Devices are known, which use plates and/or screens with touch-sensitive surfaces to detect gestures in contact only with the touch-sensitive surface of the plates and/or screens.

This greatly limits the possibilities of interaction with known devices because it confines the usable detection area to only the surface of the plate and/or screen.

Devices for recognizing touch are known, able to detect the contact of the subject with the device by means of a variation in the resistance and/or electric capacity measured by the device itself.

Since it is calibrated to detect only gestures that generate electric signals in the device above a threshold value, the measurement is normally insensitive to many types of touch, so that it does not allow a complete discrimination between the various gestures that are made.

Another problem of known devices is that they do not allow to quickly recognize repeated and/or simultaneous touches on the same device. To recognize two or more consecutive gestures, these known devices normally need an interruption in the contact between one touch and the next, with the result that there is a delay in detecting successive gestures.

It is also known that methods for recognizing gestures are not able to detect two distinct gestures simultaneously, but at most can detect a multiple touch, considering it as an individual gesture.

Another problem in the state of the art is that methods for recognizing a gesture and the corresponding devices using said methods are pre-configured and cannot be modified by the user.

Therefore, the user cannot vary the pre-set measurement thresholds and so he cannot personalize the recognition device in order to memorize, classify and recognize gestures that are not pre-set which can be more useful for his specific needs.

There is therefore a need to advance the state of the art and make available a method to recognize a gesture, and the corresponding device using said method, so as to overcome at least one of the disadvantages of the state of the art.

SUMMARY OF THE INVENTION

In accordance with one exemplary aspect, a disclosed method is able to identify and classify in real time a gesture on any physical object, and also to discriminate effectively the various gestures.

In accordance with another exemplary aspect, a disclosed device uses said method to recognize a gesture that allows detection of a touch done on one surface of the physical object, associating the device with a desired area of the physical object.

In accordance with a further exemplary aspect, the disclosed method and/or device recognize a succession of gestures that allow recognition of the individual gestures quickly, even without interrupting contact with the physical object. The Applicant has devised, tested and embodied the exemplary forms outlined herein, which may address and/or overcome the shortcomings of the state of the art and which may obtain these and other purposes and advantages.

The present invention is set forth and characterized in the independent claims, while the dependent claims describe other characteristics of the invention or variants to the main inventive idea.

In accordance with the above purposes, the present invention concerns a method to recognize a gesture made in direct or indirect contact on a physical object by means of a device using said method.

According to one aspect of the present invention, the method comprises the following steps, identified in a non-rigid order:

associating the device using said method in contact with the physical object;

supplying an entrance signal generated by a gesture made in direct or indirect contact on the physical object;

segmenting the entrance signal to obtain a group of signal segments and at least one physical value processed from the entrance signal;

processing at least a characteristic vector of signal features for each segment of the group of signal segments using the at least one physical value in order to learn the metric function between gestures;

memorizing the characteristic vectors processed with an identification label of the gesture made on the physical object;

comparing a new gesture made, in direct or indirect contact on the physical object, with the gestures previously memorized in order to possibly recognize if the new gesture made is one of the memorized gestures, evaluating and learning the metric function between the characteristic vectors, processed from the gesture made, and the characteristic vectors processed from the gestures previously memorized;

supplying a specific exit signal correlated to the specific gesture recognized and resulting from the comparison between characteristic vectors, using the learned metric function.

According to a variant, the method also provides a quality features step of the entrance signal, possibly carried out in parallel with the segmentation step, in order to obtain one or more adjustable descriptors of the gesture, to assess the characteristics of the entrance signal provided.

According to a variant, the exit signal is a digital signal that can be converted into an electric, computer or optical signal, or other type, able to command and/or control a device connected to the recognition device using the method to recognize a gesture.

According to a variant, the exit signal contains the values of likelihoods between a gesture made and at least part of the memorized gestures, so as to supply quantitative information on the similarity of the gesture made with the memorized gestures.

According to some embodiments of the present invention, the invention provides a device to recognize a gesture made on the physical object which comprises at least:

a transducer associable in contact with a physical object and configured to detect the vibrations and/or sounds generated by the gesture made on the physical object;

a reception unit configured to receive an entrance signal from the transducer generated from a gesture made on the physical object;

a segmentation unit configured to receive the entrance signal and to obtain a group of signal segments and at least one physical value processed from to the entrance signal;

a processing unit configured to calculate at least a characteristic vector of signal features for each segment of the group of signal segments using the at least one physical value processed from the entrance signal;

a memory unit configured to memorize the characteristic vectors, processed by the entrance signal, and an identification label of the gesture made on the physical object;

a comparison-learning unit configured to recognize if a new gesture made on the physical object is one of the gestures memorized in the memory unit, comparing and learning the metric function between the characteristic vectors memorized and those processed on each occasion starting from the entrance signal correlated to the new gesture made;

a command unit configured to supply a specific exit signal correlated to the specific gesture made and possibly recognized resulting from the comparison with the metric function.

According to a variant, the transducer associable in contact with a physical object is an adhesive piezo-transducer contact microphone, configured to capture the sounds and/or the vibrations generated by a gesture made on the physical object.

According to a variant, the device comprises a quality features unit configured to obtain one or more adjustable descriptors of the gesture to assess the characteristics of the entrance signal supplied to it by the reception unit.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 1:
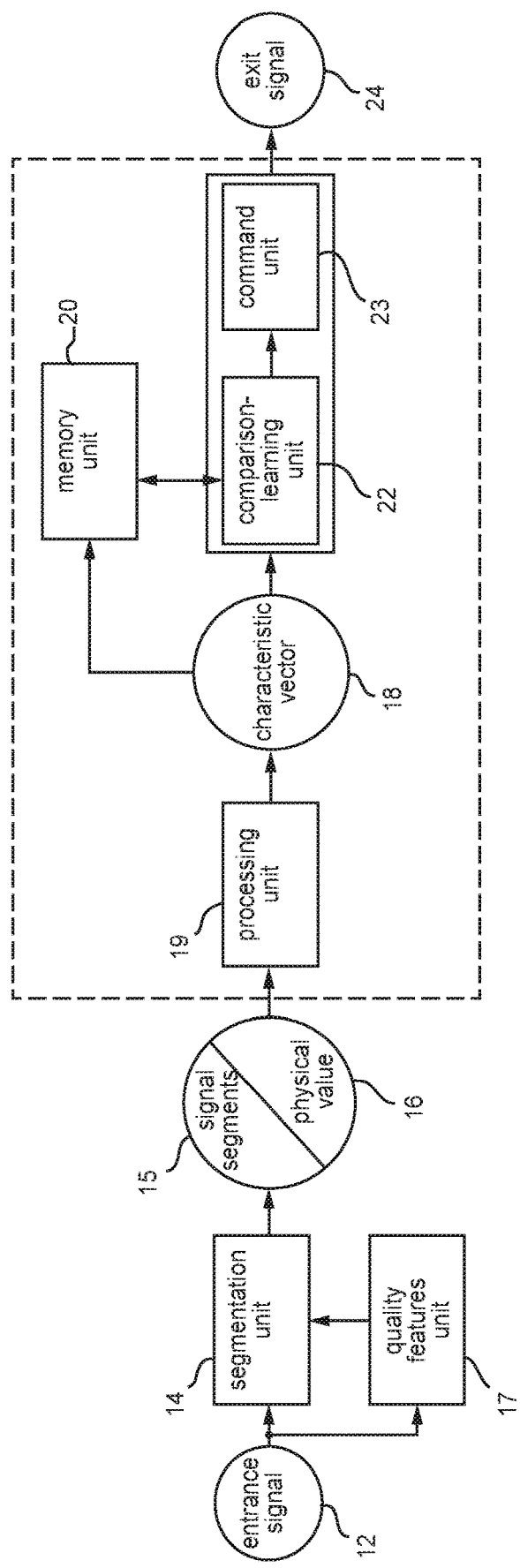
FIG. 1 shows a block diagram of a method to recognize a gesture according to the present invention.
Figures 2, 3:
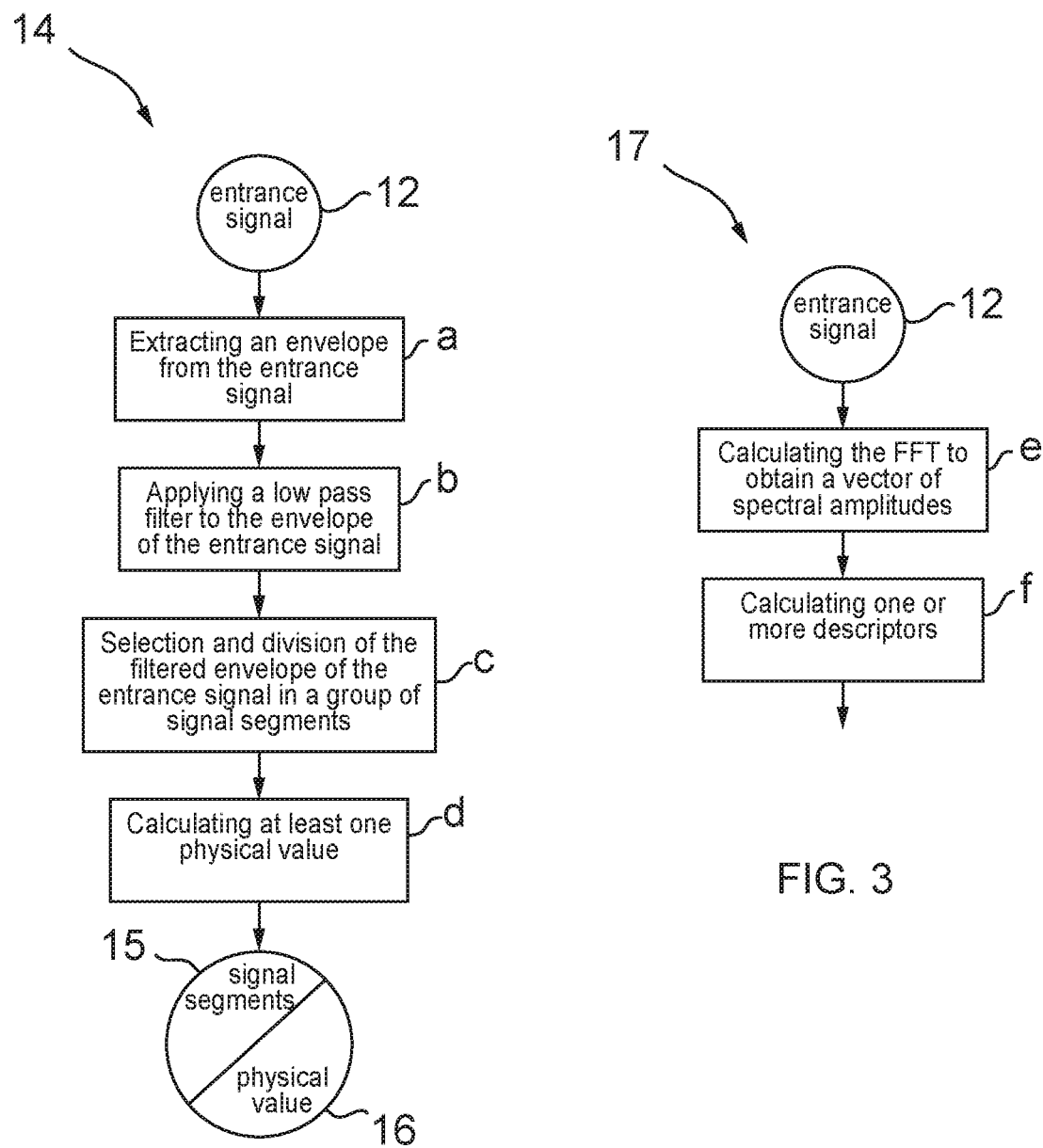
FIGS. 2-4 show three block diagrams of three steps of a method according to the present invention.
Figure 4:
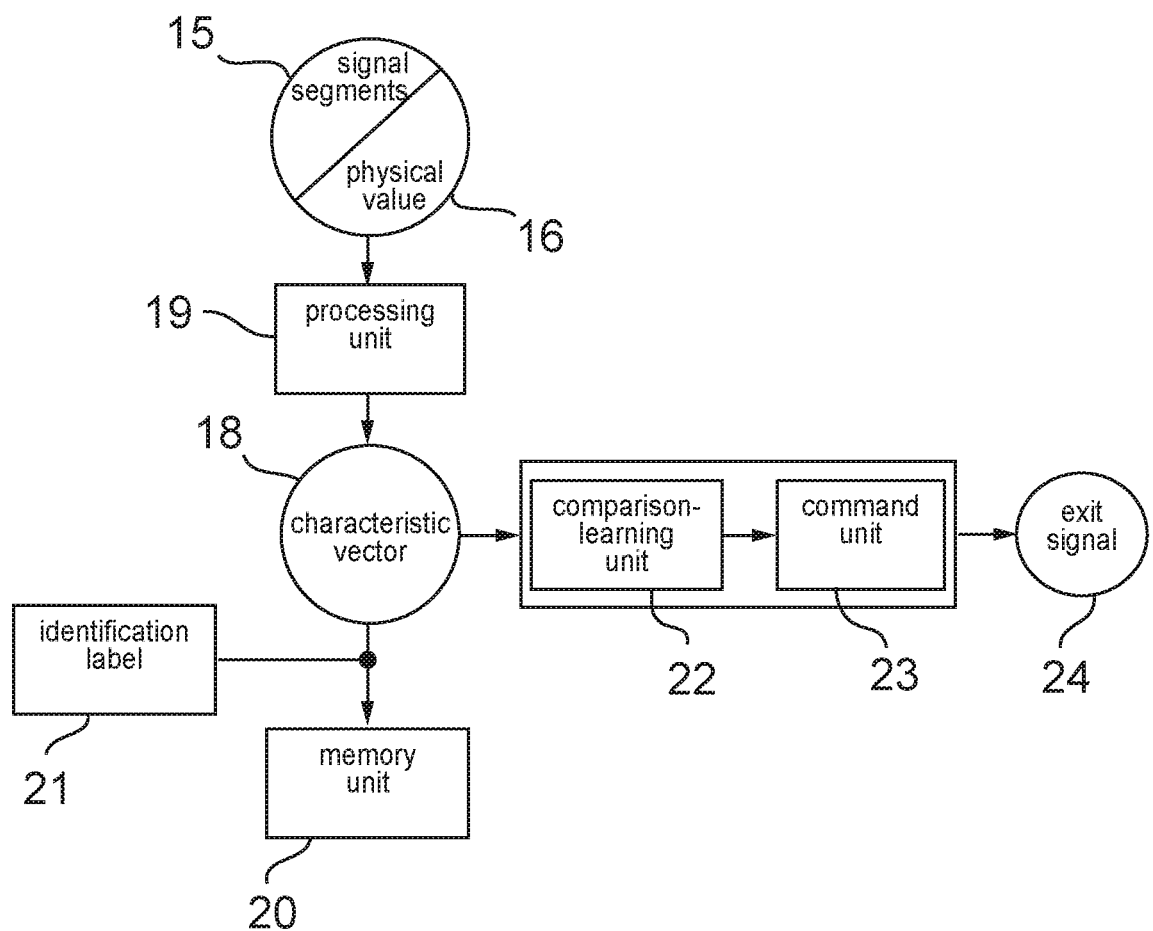
Figure 5:
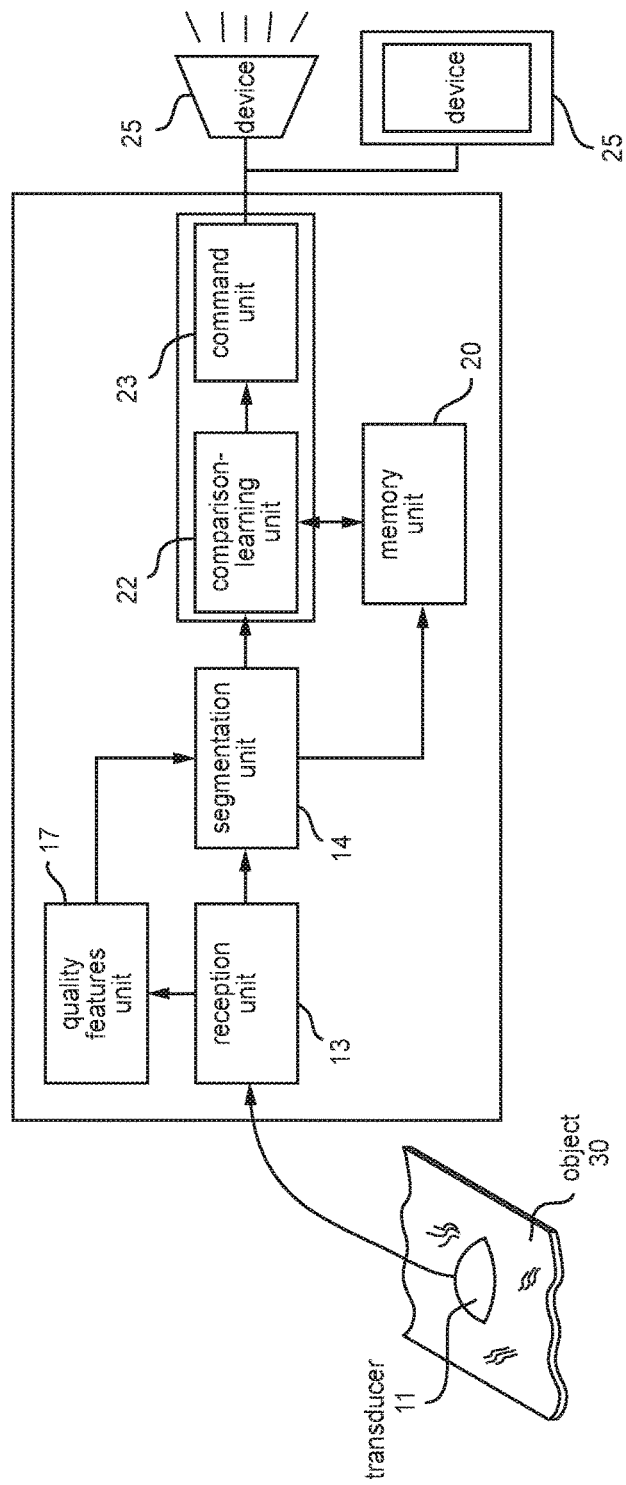
FIG. 5 shows a perspective and schematic view of a device to recognize a gesture associated with a physical object and using a method according to the present invention.

With reference to the drawings, which show non-restrictive examples of the invention, we will now describe embodiments of a method to recognize a gesture made on a physical object 30 associated with a device 10 using said method.

By gesture we mean any physical action made in direct or indirect contact, or by means of another element, by a subject on the physical object 30 associated with the device 10.

By way of non-restrictive example, a gesture can be a hit, a swipe, a graze, a scratch, a touch or other type of gesture of various length and intensity even when the gesture is being made.

By way of non-restrictive example, by physical object 30 we mean a board, a sheet, a wall or in any case any physical object 30 with a physical form, roughness, consistency or other characteristics.

According to one aspect of the present invention, the device 10 comprises a transducer 11 associable in contact with any type of physical object 30.

The transducer 11 is configured to detect the vibrations and/or sounds generated by the gesture made on any desired zone of the physical object 30.

In this way, contrary to the state of the art, the gestures can be made on the whole usable surface of the physical object 30 and are no longer limited to a zone defined by a plate and/or screen with defined dimensions.

Furthermore, because of this, it is possible to position the transducer 11 on zones that on each occasion have various shapes and consistency even of the same physical object 30, so as to personalize the gesture according to requirements and to the surfaces available.

According to one aspect of the present invention, the transducer 11 is sensitive to various types of gestures which can be made in succession on the physical object 30 even without interrupting contact with the physical object 30 itself.

The transducer 11 is able to detect directly the vibrations and/or sounds mechanically propagated by the physical object 30 and, hence, it does not need to identify any variation in resistance and/or electric capacity.

According to one embodiment, the transducer 11 is an adhesive piezo-transducer contact microphone which, once associated in contact with a physical object 30, is able to capture the sounds and/or the vibrations generated by the gesture made on the physical object 30 and to convert them into an electric signal in function of the type of gesture made.

In this case, an improvement is obtained to insulation from sources of external noise because the transducer 11 does not detect the sounds not transmitted by the physical object 30, such as for example voices, music or other.

According to one embodiment, the transducer 11 can be calibrated to be sensitive to an acoustic or detection range, defined on each occasion according to specific operating requirements.

For example, the transducer 11 can be sensitive to the normal human acoustic range, or to other acoustic and/or mechanical ranges to allow to detect the vibrations and/or sounds inaudible to human.

The possibility of adjusting the sensitivity is particularly advantageous if it is desired to detect high-resolution vibrations, potentially inaudible to human, such as for example specific mechanical vibrations generated by a piezo-electric positioner or other element.

According to one aspect of the present invention, the transducer 11 converts the vibrations and/or sounds generated by the gesture on the physical object 30 into a corresponding entrance signal 12 that is transmitted to a reception unit 13 in a timed manner.

The timing actuated, for example by a buffer or other programmable circuit or unit, allows to analyze and process two or more consecutive or partly overlapping gestures, in a distinct manner.

The entrance signal 12 is correlated to the vibration and/or sound detected by the transducer 11 and can be transmitted either by cable that connects the transducer 11 to the reception unit 13 or directly telematically.

According to one embodiment, the reception unit 13 can be an electronic circuit, a microprocessor or other similar and comparable electronic units that allow to receive and then transmit the entrance signal 12 to other units of the device 10.

The other units comprised in the device 10 that will be described hereafter in the description, like the reception unit 13, can also be electronic circuits, microprocessors or other similar and comparable electronic units.

According to one aspect of the invention, the device 10 comprises a segmentation unit 14 configured to receive the entrance signal 12 from the reception unit 13 and to suitably divide it so as to obtain a group of signal segments 15 and at least one physical value 16 processed from the entrance signal 12.

According to one aspect of the present invention, the method to recognize a gesture provides that the entrance signal 12 is segmented by the segmentation unit 14 and the method provides that the following sub-steps are carried out:

a—extracting an envelope from the entrance signal 12 to obtain a rough estimation of the sample-wise amplitude of the signal, that is, a signal defining the functional form of the amplitudes of the entrance signal 12;

b—applying a low pass filter to the envelope of the entrance signal 12 to obtain a signal with a functional profile of the envelope without noise coming from other sources or external agents that are not generated by or correlated to the gesture made;

c—selection and division of the filtered envelope of the entrance signal 12 in a group of signal segments 15 which comprises segments or parts of the entrance signal 12 which satisfy an adjustable threshold condition on the amplitude of the signal, according to the sensitivity to be obtained. Each segment detected is inserted into the group of signal segments 15 if the amplitude of the envelope is greater than or equal to a threshold value. To prevent two segments from being detected in a non-sensitive period of time, the temporal division of the segments is timed by setting a minimum barrier time interval.

d—calculating at least one physical value 16 from the entrance signal 12, such as, for example, the gesture group velocity computed as the maximum in amplitude of the segmented signal.

According to one embodiment, in parallel to the segmentation of the entrance signal 12, the method provides that a quality features step of the entrance signal 12 can also be carried out.

The quality features step is carried out by a quality features unit 17 configured to calculate and obtain descriptors of the entrance signal 12 possibly adjustable to assess the characteristics of the entrance signal 12 and hence to improve the recognition of the gesture obtainable by the method.

According to one embodiment, the quality features unit 17 is configured to receive the entrance signal 12 from the reception unit 13 and the method provides to carry out the following sub-steps:

e—calculating the fast Fourier transform (FFT) to obtain a vector of spectral amplitudes;

f—calculating one or more descriptors computed, for example, as the first three spectral moments, i.e. energy, median or centroid of the spectrum and the spread.

According to one embodiment, the descriptors can be calculated continuously and are used to obtain an accurate control of the quality of the entrance signal 12 that is transmitted to the segmentation unit 14 or directly to a command unit 23.

According to one aspect of the present invention, the device 10 comprises a processing unit 19 configured to calculate at least a characteristic vector 18 of signal features, processing each segment of the group of signal segments 15 using the at least one physical value 16 obtained by the segmentation unit 14.

According to one aspect of the present invention, the device 10 is able to memorize the entrance signals 12 generated by the gestures made on the physical object 30, associating with every specific entrance signal 12 at least one specific characteristic vector 18 of signal features for each segment of the group of signal segments 15 and learning the metric function between the characteristic vectors 18 of the gestures.

According to one embodiment, the characteristic vector 18 can comprise cepstral coefficients, spectral moments, i.e. energy, centroid, spread, or other physical values such as the group velocity or the amplitude of the entrance signal 12.

According to one embodiment, the device 10 allows to personalize the types of gestures recognizable, creating and memorizing a series of gestures in a memory unit 20 identifying each gesture with an identification label 21 and at least one characteristic vector 18.

Using the memorized gestures characteristic vectors 18 and the characteristic vector 18 of the gesture made, it is possible to calculate for each element of the characteristic vector 18 a metric function in order to quantify how much two gestures, identified by their identification label 21, are similar, following the sub-steps:

ordering the characteristic vectors 18 of the gestures according to their identification label 21;

applying the metric function to compare characteristic vectors 18 of the gestures for classification;

assessing the metric function on the ordered characteristic vector 18 of the gesture;

adjusting the metric function to minimize classification errors and iterate until the errors are minimum.

In particular, the method provides to attribute for each element a relevance degree in order to give more importance to the elements, which are more useful to compare two entrance signals 12, generated from two gestures and to classify them.

The characteristic vectors 18 are calculated on each occasion and used to compare and quantify, by means of metric function, how much a gesture made on the physical object 30 is similar to those previously memorized.

According to one aspect of the invention, the at least one characteristic vector 18 is calculated for every entrance signal 12 so as to be able to be used to compare and possibly recognize the entrance signals 12 correlated to the gestures previously memorized.

According to one embodiment, the device 10 can also memorize the metric function between the characteristic vectors 18 of the gestures.

Thanks to this, it is possible to personalize on each occasion the types and set of gestures to be compared and recognized, so that an external device can then be controlled and/or commanded in a desired manner, based on the specific gesture made on the physical object 30.

One of the possible applications is that the device 10 can be used to reproduce a specific sound based on the specific gesture made on the physical object 30.

If it is desired to memorize or learn a gesture, the memorization or learning step must be enabled, which takes place following the calculation of the characteristic vectors 18.

According to one aspect of the invention, the memorization step provides to associate an identification label 21 of the gesture made with the corresponding characteristic vector 18 calculated and then to memorize both in the memory unit 20.

The gestures made on the physical object 30 are memorized in the memory unit 20, attributing to each one of them at least one characteristic vector 18 and an identification label 21, so as to be able to subsequently identify, during the step of comparison and learning, to which gesture the minimal metric function between the characteristic vectors 18 of the gestures corresponds.

According to one aspect of the present invention, the device 10 comprises a comparison-learning unit 22, configured to compare at least one characteristic vector 18, corresponding to a gesture made on the physical object 30, with the characteristic vectors 18 memorized in the memory unit 20 and to recognize whether, possibly, the gesture is contained therein.

In particular, according to one embodiment, the comparison-learning unit 22 calculates the metric function between the characteristic vector 18 processed of the gesture made and each characteristic vector 18 of the gestures previously memorized.

According to one aspect of the present invention, the comparison-learning unit 22 is designed also to memorize and learn the metric function between the characteristic vectors 18 calculated.

This is an important aspect of the invention because it allows to improve the recognition of the gesture made quantifying how similar it is in comparison with the memorized gestures.

According to one embodiment, the comparison-learning unit 22 is also called classifier because it allows to quantify the similarity of the gesture made with each gesture memorized according to the metric function between the characteristic vectors 18. In particular, the comparison-learning unit 22 is also able to supply the values of likelihoods of each gesture memorized with the gesture made.

The present method allows to obtain a high degree of discrimination between the various gestures, even very similar to each other, because it operates on the segmented signal and therefore, if there are differences inside the group of signal segments 15 between two similar gestures, these differences are identified and hence discriminated.

In other words, the possibility of analyzing the entrance signal 12 segment by segment allows to identify if there are even small differences between similar gestures, so as to have a high degree of discrimination compared with the state of the art.

Furthermore, given that the comparison step is carried out on all the gestures memorized and in particular on the memorized characteristic vectors 18, it is also possible to verify the degree of likelihoods on the whole plurality of memorized gestures with the gesture made, making the discrimination between similar gestures even more efficient.

In addition, given that the comparison step provides the degree of likelihoods from the segments of the group of signal segments 15 of the entrance signal 12 and the memorized gestures, it is possible to specify the entrance signal 12 as a combination of the memorized gestures weighted by their likelihood. This interpolation process gives access to the continuous space of possible gestures rather than the space defined by the memorized gestures only.

According to one possible embodiment, the comparison-learning unit 22 supplies at exit the identification label 21 of the memorized gesture for which the metric function or difference between the characteristic vectors 18 are minimal, i.e. there is a high probability that it will be recognized.

According to one embodiment of the present invention, given that the comparisons are carried out on a group of signal segments 15 and not on the whole group of values of the entrance signal 12, it is possible to obtain a recognition of the gesture within limited time intervals, for example in the range of milliseconds, and without needing to interrupt the contact with the physical object 30.

According to one aspect of the present invention, once the specific gesture made has been recognized among those memorized in the memory unit 20, it is possible to supply, by means of a command unit 23, a specific exit signal 24 correlated to the specific gesture recognized.

In particular, the exit signal 24 can be a digital, electric, computer, or optical signal that can command and/or control a device 25 connected to the device 10.

According to a preferential embodiment, the device 10 is able to supply an exit signal 24 to a smartphone, tablet or computer, to reproduce a specific signal, for example a sound, according to the specific gesture made and recognized by the device 10.

According to one embodiment, the device 10 is able to control devices 25 outside the device 10 such as videogame consoles, computers, tablets, smartphones or other devices.

It is clear that modifications and/or additions of parts may be made to the method to recognize a gesture and the corresponding device 10 using said method as described heretofore, without departing from the field and scope of the present invention.

It is also clear that, although the present invention has been described with reference to some specific examples, a person of skill in the art shall certainly be able to achieve many other equivalent forms of method to recognize a gesture and the corresponding device 10 using said method, having the characteristics as set forth in the claims and hence all coming within the field of protection defined thereby.

The invention claimed is:

1. A method for recognizing a gesture, wherein said method comprises the following steps:
   a first device:
      receiving an entrance signal generated by a gesture made in direct or indirect contact on another physical object associated with the first device;
      calculating one or more adjustable descriptors of the gesture to assess characteristics of said entrance signal;

segmenting, based on the adjustable descriptors, said entrance signal to obtain a group of signal segments and calculating a plurality of physical values from said entrance signal, wherein at least one of said physical values is computed based on a maximum value of amplitude of the segmented signal;

calculating at least a characteristic vector of signal features for each segment of said group of signal segments using said at least one physical value; and processing the characteristic vector of signal features for each segment of said group of signal segments in order to learn a metric function between gestures;

a second device:

determining, based on the metric function between gestures and characteristics of an entrance signal received by the second device, a specific exit signal correlated to a new gesture made in direct or indirect contact on another physical object associated with the second device; and supplying the specific exit signal to another device, wherein the characteristic vectors of signal features are calculated using the plurality of physical values.

2. The method as in claim 1, further comprising a step of memorizing said characteristic vectors processed with an identification label of the gesture made on said physical object associated with the first device.

3. The method as in claim 1, wherein determining the specific exit signal includes comparing the metric function learned by the first device and characteristic vectors processed from the new gesture.

4. The method as in claim 1, wherein the first device further performs:

receiving another entrance signal generated by another gesture made in direct or indirect contact on said physical object associated with the first device;

applying the metric function to compare characteristic vectors of the other gesture for classification; and adjusting the metric function to minimize classification errors and iterate until the errors are minimum.

5. The method as in claim 1, wherein calculating the one or more adjustable descriptors is carried out in parallel with the segmentation.

6. The method as in claim 1, wherein the first device further extracts an envelope from said entrance signal to obtain a signal defining the functional form of the amplitudes of said entrance signal.

7. The method as in claim 6, wherein the first device further applies a low pass filter to said envelope of said entrance signal to obtain a signal with a functional profile of said envelope without noise coming from other sources or external agents that are not generated by or correlated to the gesture made on said physical object associated with the first device.

8. The method as in claim 6, wherein the first device further dividing said filtered envelope of said entrance signal in said group of signal segments comprising segments or parts of said entrance signal, said segments being temporally detected if they are greater than or equal to a threshold value of amplitude.

9. The method as in claim 1, wherein at least one of said physical values comprises a gesture group velocity of said entrance signal computed as the maximum in amplitude of the segmented signal.

10. The method as in claim 1, wherein the first device further calculates the fast Fourier transform of said entrance signal to obtain a vector of spectral amplitudes.

11. The method as in claim 10, wherein the one or more descriptors are computed as three spectral moments from said vector of spectral amplitudes.

12. The method as in claim 1, wherein said exit signal is a digital, electric, computer or optical signal that commands and/or controls the other device connected to said device using said method.

13. The method as in claim 1, wherein said exit signal contains a likelihood value of the new gesture made on said physical object associated with the second device with the gesture made in direct or indirect contact on said physical object associated with the first device, said likelihood value being calculated by comparing said characteristic vector with the new gesture.

14. A device comprising:

a transducer associable in contact with another physical object associated with the device and configured to detect vibrations and/or sounds generated by a gesture made in direct or indirect contact on said physical object;

a reception unit configured to receive an entrance signal from said transducer generated from said gesture made on said physical object;

a quality features unit configured to calculate one or more adjustable descriptors of the gesture to assess characteristics of said entrance signal;

a segmentation unit configured to segment, based on the adjustable descriptors, said entrance signal to provide a group of signal segments, and calculate a plurality of physical values from said entrance signal, wherein at least one of said physical values is computed based on a maximum value of amplitude of the segmented signal; and a processing unit configured to calculate at least one characteristic vector of signal features for each segment of said group of signal segments using said at least one physical value, and process the characteristic vector of signal features for each segment of said group of signal segments to learn a metric function between gestures, the metric function usable by a second device for determining a specific exit signal correlated to a new gesture made in direct or indirect contact on another physical object associated with the second device, wherein the characteristic vectors of signal features are calculated using the plurality of physical values.

15. The device as in claim 14, wherein said transducer associable in contact with said physical object is an adhesive piezo-transducer contact microphone configured to capture the sounds and/or the vibrations generated by a gesture made on said physical object.

16. The device as in claim 14, further comprising a memory unit configured to store said at least one characteristic vector and an identification label defining the gesture made on said physical object associated with the device.

17. The device as in claim 14, further comprising a comparison-learning unit configured to recognize if a new gesture made on said physical object is one of the gestures stored in said memory unit.

18. The device as in claim 14, wherein the quality features unit obtaining the one or more adjustable descriptors of the gesture includes calculating fast Fourier transform (FFT) to obtain a vector of spectral amplitudes of said entrance signal.

19. The device as in claim 14, wherein the quality features unit is configured to calculate descriptors continuously.

20. A system comprising:

a transducer configured to contact a physical object and configured to detect vibrations and/or sounds generated upon a gesture made in direct or indirect contact to the physical object;

a processing system including memory and at least one processor, the processing system coupled to the transducer and configured to:

receive an entrance signal from the transducer generated in response to the gesture made in direct or indirect contact to the physical object;

calculate one or more adjustable descriptors of the gesture to assess quality characteristics of said entrance signal;

determine, based on the adjustable descriptors, a segmented signal including a group of signal segments from said entrance signal;

calculate a plurality of physical values from said entrance signal, wherein at least one of said physical values is computed based on a maximum value of amplitude of the segmented signal;

calculate, for each segment of said group of signal segments, a characteristic vector of signal features using said at least one physical value; and process the characteristic vector of signal features for each segment of said group of signal segments to learn a metric function between gestures, the metric function usable by another processing system for determining a specific control signal correlated to a new gesture made in direct or indirect contact on another physical object associated with the other processing system, wherein the characteristic vectors of signal features are calculated using the plurality of physical values.

21. The system of claim 20, wherein at least one of said physical values is a gesture group velocity of said entrance signal computed based on the amplitude of the segmented signal.

* * * * *